US010412798B2

(12) United States Patent
Eum et al.

(10) Patent No.: US 10,412,798 B2
(45) Date of Patent: Sep. 10, 2019

(54) CONTROL SYSTEM FOR PHASE-CUT DIMMING

(71) Applicant: FAIRCHILD KOREA SEMICONDUCTOR LTD., Bucheon-si (KR)

(72) Inventors: Hyunchul Eum, Seoul (KR); Youngjong Kim, Seoul (KR); Kuo-Hsien Huang, New Taipei (TW); Chih-Chun Chuang, Taichung (TW); Young Mo Yang, Seoul (KR); Young Je Lee, Bucheon-si (KR); Moon Ho Choi, Bucheon (KR); Moon Sik Song, Bucheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 36 days.

(21) Appl. No.: 15/835,119

(22) Filed: Dec. 7, 2017

(65) Prior Publication Data
US 2018/0098398 A1  Apr. 5, 2018

Related U.S. Application Data

(62) Division of application No. 14/937,179, filed on Nov. 10, 2015, now Pat. No. 9,872,349.
(Continued)

(51) Int. Cl.
H05B 33/08 (2006.01)

(52) U.S. Cl.
CPC ..... *H05B 33/0818* (2013.01); *H05B 33/0812* (2013.01); *H05B 33/0845* (2013.01);
(Continued)

(58) Field of Classification Search
CPC ............ H05B 33/0818; H05B 33/0812; H05B 33/0845; H05B 33/0809; H05B 33/0815;
(Continued)

(56) References Cited

U.S. PATENT DOCUMENTS 7,295,452 B1    11/2007  Liu
7,667,408 B2 *   2/2010  Melanson .......... H05B 33/0809
                                                    315/209 R
(Continued)

*Primary Examiner* — Tung X Le
*Assistant Examiner* — Borna Alaeddini
(74) *Attorney, Agent, or Firm* — AMPACC Law Group, PLLC

(57) ABSTRACT

A phase-cut dimming control system according to the embodiment includes a phase angle detector configured to detect a phase angle of an input voltage generated by phase-cut dimming, a feedback signal generator configured to generate a first reference signal corresponding to the detected phase angle, and generate an initial feedback signal based on a detection signal corresponding to power supplied to a load and the first reference signal, a feedback signal modulator configured to modulate the initial feedback signal and generate a feedback signal, a power transmission controller configured to generate a control signal which controls power transmission according to the feedback signal, and a power transmission circuit configured to transmit power to the load according to the control signal.

14 Claims, 12 Drawing Sheets

Related U.S. Application Data

(60) Provisional application No. 62/077,394, filed on Nov. 10, 2014.

(52) U.S. Cl.
CPC ...... *H05B 33/0809* (2013.01); *H05B 33/0815* (2013.01); *H05B 33/0824* (2013.01); *H05B 33/0851* (2013.01); *Y02B 20/343* (2013.01)

(58) Field of Classification Search
CPC .......... H05B 33/0824; H05B 2820/343; H05B 33/0851; Y02B 20/343
See application file for complete search history.

(56) References Cited

U.S. PATENT DOCUMENTS

| | | | |
|---|---|---|---|
| 7,759,881 B1 | 7/2010 | Melanson | |
| 8,558,477 B2 | 10/2013 | Bordin et al. | |
| 8,558,518 B2 | 10/2013 | Irissou et al. | |
| 8,890,425 B2 | 11/2014 | Zeng | |
| 9,066,381 B2* | 6/2015 | Valois | H05B 37/0227 |
| 9,131,581 B1 | 9/2015 | Hsia et al. | |
| 9,942,954 B2* | 4/2018 | Neudorf | H05B 33/0815 |
| 2008/0224633 A1* | 9/2008 | Melanson | H05B 33/0809 |
| | | | 315/292 |
| 2011/0074302 A1 | 3/2011 | Draper et al. | |
| 2011/0080110 A1* | 4/2011 | Nuhfer | H05B 33/0815 |
| | | | 315/291 |
| 2011/0266967 A1 | 11/2011 | Bordin et al. | |
| 2012/0268026 A1* | 10/2012 | Crawford | H05B 33/0815 |
| | | | 315/210 |
| 2013/0063047 A1* | 3/2013 | Veskovic | H05B 33/0815 |
| | | | 315/307 |
| 2013/0229215 A1* | 9/2013 | Sadwick | H03K 3/84 |
| | | | 327/164 |
| 2015/0359052 A1 | 12/2015 | van den Broeke et al. | |
| 2016/0360589 A1* | 12/2016 | Neudorf | H05B 33/0815 |

* cited by examiner

CONTROL SYSTEM FOR PHASE-CUT DIMMING

CROSS-REFERENCE TO RELATED APPLICATIONS

This application is a divisional of U.S. application Ser. No. 14/937,179, filed on Nov. 10, 2015, which claims priority from U.S. Provisional Application No. 62/077,394, filed on Nov. 10, 2014. The just-mentioned related applications are incorporated herein by reference in their entirety.

BACKGROUND

(a) Field

Embodiments relate to a control system for phase-cut dimming.

(b) Description of the Related Art

When an alternating current (AC) is supplied to a power transmission circuit through a dimmer, a phase of the AC can be passed as much as a dimming angle. At this time, a system for controlling power supplied to a load of the power transmission circuit is needed.

SUMMARY OF THE INVENTION

Embodiments are directed to providing a control system of phase-cut dimming through embodiments.

One aspect of the invention provides a phase-cut dimming control system including a phase angle detector configured to detect a phase angle of an input voltage generated by phase-cut dimming, a feedback signal generator configured to generate a first reference signal corresponding to the detected phase angle, and generate an initial feedback signal based on a detection signal corresponding to power supplied to a load and the first reference signal, a feedback signal modulator configured to modulate the initial feedback signal and generate a feedback signal, a power transmission controller configured to generate a control signal which controls power transmission according to the feedback signal, and a power transmission circuit configured to transmit power to the load according to the control signal.

The feedback signal modulator may include a hysteresis filter to output the feedback signal based on a hysteresis level corresponding to a variation of the initial feedback signal among a plurality of hysteresis levels.

The power transmission controller may include an input current controller to control an amount of an input current that flows into the power transmission circuit according to the feedback signal.

The power transmission circuit may control a duty according to the control signal. Further, the power transmission circuit may control the amount of the input current according to a reference signal based on the control signal.

The power transmission controller may include a powering operation controller to control a time during which power is transmitted from the power transmission circuit to the load according to the feedback signal.

The powering operation controller may detect the power transmission time by counting time. Further, the powering operation controller may control the power transmission circuit to transmit power during a period in which the input voltage is at a level equal to or more than a predetermined level determined according to the feedback signal.

The power transmission circuit may perform a switching operation during an enabled period according to the control signal.

The power transmission circuit may control the input current during an enabled period of a reference signal based on the control signal, and the input current may not be generated during a disabled period of the reference signal in the power transmission circuit.

Another aspect of the invention provides a phase-cut dimming control system including a linear regulator configured to control a current that flows in at least one LED, and a power transmission controller configured to receive a feedback current that flows in the at least one LED, and to control the linear regulator to control an amount of an input current supplied to the at least one LED or a period in which the input current flows.

The phase-cut dimming control system may further include a feedback signal generator configured to generate a feedback signal according to the current which flows in the at least one LED.

The phase-cut dimming control system may further include a feedback signal modulator configured to modulate the feedback signal.

The feedback signal generator may generate the feedback signal using a difference between a reference signal and a signal corresponding to the current which flows in the at least one LED, and the reference signal may be based on a phase angle of an input voltage supplied to the at least one LED.

The feedback signal generator may generate the feedback signal which uniformly regulates the current which flows in the at least one LED when the detected phase angle is a predetermined threshold value or more.

The power transmission controller may generate a control signal according to the feedback signal, and the linear regulator may control the amount of the input current according to a reference signal based on the control signal.

Further, the linear regulator may control the input current according to a reference signal during an enabled period of the reference signal based on the control signal. The input current may not be generated during a disabled period of the reference signal.

The power transmission controller may determine a period, in which an input voltage supplied to the at least one LED is at a level equal to or more than a predetermined level determined according to the feedback signal, as the enabled period of the reference signal.

Still another aspect of the invention provides a phase-cut dimming control system including a linear regulator configured to control a current which flows in at least one LED, an input voltage detector configured to generate a first control signal based on a result in which an input voltage supplied to the at least one LED is detected, and a power transmission controller configured to control the linear regulator according to the first control signal and control an amount of an input current supplied to the at least one LED or a period in which the input current flows.

Yet another aspect of the invention provides a phase-cut dimming control system including a linear regulator configured to control a current which flows in at least one LED, and a power transmission controller configured to control the linear regulator according to a preset control signal and control an amount of an input current supplied to the at least one LED or a period in which the input current flows.

A control system for phase-cut dimming is provided through the embodiments.

DETAILED DESCRIPTION OF THE EMBODIMENTS

Figure 1:
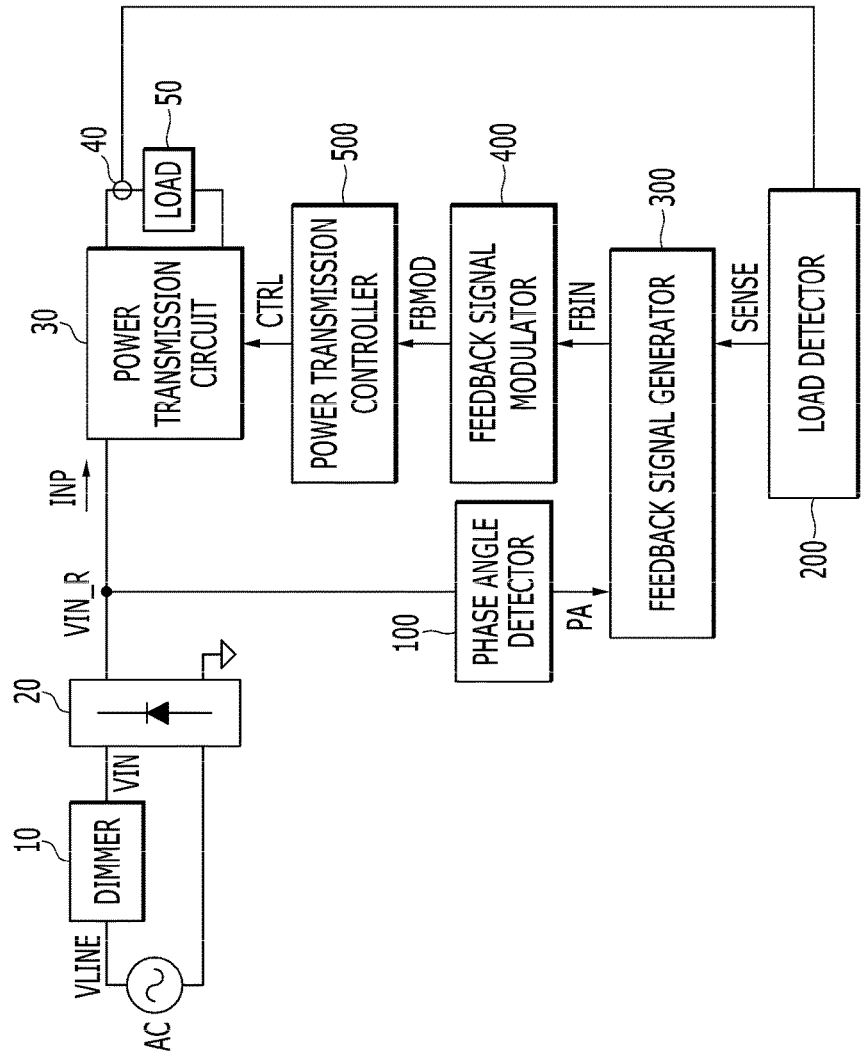
FIG. 1 is a view illustrating an application example of a control system for phase-cut dimming according to one embodiment.

Hereinafter, exemplary embodiments of the invention will be described in detail with reference to the accompanying drawings so as to enable one skilled in the art to which the invention pertains to easily carry out. However, the invention may be embodied as various different forms and is not limited to the embodiments described herein. In order to clearly describe the invention, in addition, a structure and an element which do not relate to the detail description are not shown in the drawings, and similar elements in the following description are designated by similar reference numerals.

In the following description, it will be understood that when an element is referred to as being "connected" to another element, it can be "directly connected" to another element or "electrically connected" to another element with intervening elements. Further, when there is an expression that some portion "includes" some structural elements, this means that some portion does not exclude another structural element, but may further include another structural element unless referred to the contrary.

FIG. 1 is a view illustrating an application example of a control system for phase-cut dimming according to one embodiment.

As shown in FIG. 1, an alternating current (AC) is supplied to a power transmission circuit 30 through a dimmer 10 and a rectifier circuit 20. Power is supplied from the power transmission circuit 30 to a load 50. The power supplied to the load 50 may be detected by a sensor 40 and the detection result may be transmitted to a load detector 200.

As much AC as a preset dimming angle passes through the dimmer 10 according to the embodiment, and the dimmer 10 blocks phases other than those within the dimming angle among phases of a line voltage VLINE. A voltage VIN phase-cut by the dimmer 10 is rectified through the rectifier circuit 20, and an input voltage VIN_R is generated. Such an input voltage VIN_R, on which phase-cut dimming is performed, is transmitted to the power transmission circuit 30.

The rectifier circuit 20 according to the embodiment generates the input voltage VIN_R by full-wave rectifying the voltage VIN with a full-wave rectifier circuit. The power transmission circuit 30 supplies the power to the load 50 using the input voltage VIN_R.

A phase angle detector 100 generates a phase angle signal PA based on a phase angle ratio with respect to one half cycle of the line voltage VLINE. Hereinafter, the phase angle refers to a dimming angle of the dimmer 10. Since the one half cycle of the line voltage VLINE is the same as one cycle of the input voltage VIN_R, the phase angle detector 100 may generate the phase angle signal PA based on a phase angle ratio with respect to the one cycle of the input voltage VIN_R.

Figure 3:
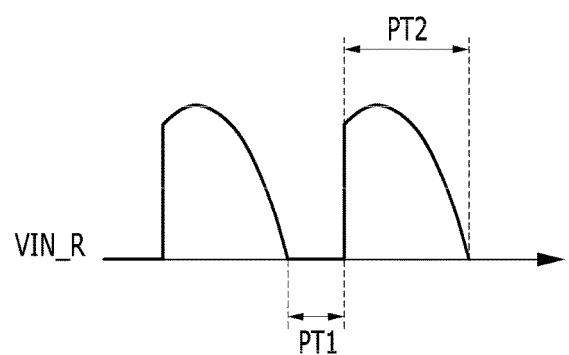
FIG. 3 is a view illustrating a waveform of an input voltage.

FIG. 3 is a view illustrating a waveform of an input voltage. As shown in FIG. 3, the phase angle detector 100 detects a period PT2 in which the input voltage VIN_R is generated for one cycle (PT1+PT2) of the input voltage VIN_R. The phase angle detector 100 may generate a phase angle signal PA based on a value (PT2/(PT1+PT2)) calculated by dividing the period PT2 by the cycle (PT1+PT2).

The load detector 200 may detect the load 50 using the output of the sensor 40. The sensor 40 may have a configuration capable of detecting a current supplied to the load 50. The invention is not limited thereto, and the load detector 200 may indirectly detect the power supplied to the load 50. Since a detailed method thereof is clearly understood through the art to which the invention pertains to easily carry out, a detailed description thereof will be omitted. The load detector 200 generates a signal SENSE detected according to the detection result of the power supplied to the load 50.

For example, the load detector 200 may directly receive information on a current detected by the sensor 40. When the load detector 200 is insulated from the load 50, the load detector 200 may indirectly detect the current, which flows in the load 50, through an opto-coupler.

A feedback signal generator 300 generates a reference signal based on the phase angle signal PA, and an initial feedback signal FBIN is generated using a difference between the signal SENSE detected from the load detector 200 and the reference signal.

A feedback signal modulator 400 modulates the initial feedback signal FBIN to generate a feedback signal FBMOD. The feedback signal modulator 400 may generate the feedback signal FBMOD by filtering noise components of the initial feedback signal FBIN.

A power transmission controller 500 generates a control signal CTRL for a power transmission control according to the feedback signal FBMOD, and the control signal CTRL may be transmitted to the power transmission circuit 30.

Figure 2:
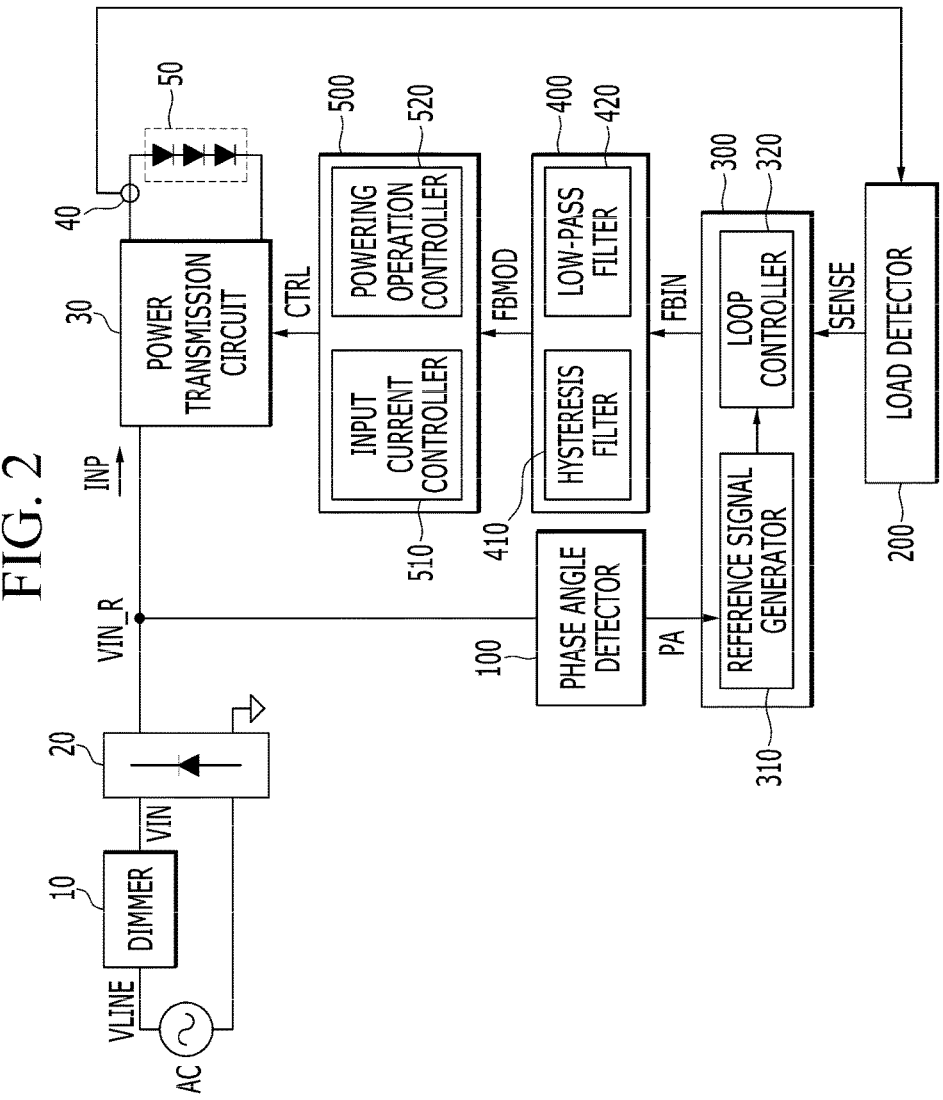
FIG. 2 is a block diagram illustrating each configuration of one embodiment.

FIG. 2 is a block diagram illustrating each configuration of one embodiment.

A load 50 may include at least one light emitting diode (LED), and the load 50 is implemented with three LEDs connected in series in FIG. 2. Furthermore, a load detector 200 detects a current, which flows in the load 50, through a sensor 40 in FIG. 2.

As shown in FIG. 2, a feedback signal generator 300 includes a reference signal generator 310 and a loop controller 320. A reference signal generator 310 generates a reference signal REF based on a phase angle signal PA.

Figure 4A:
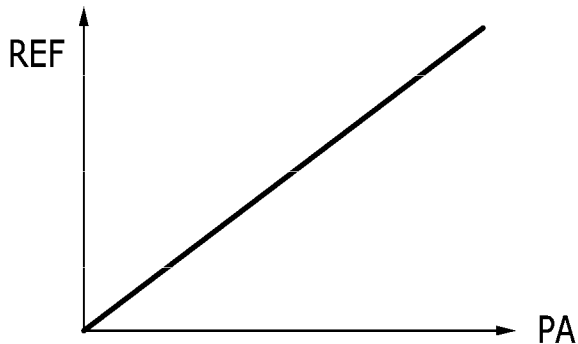
FIG. 4A is a view illustrating one example of a relationship between a phase angle signal and a reference signal.

FIG. 4A is a view illustrating one example of a relationship between a phase angle signal and a reference signal.

As shown in FIG. 4A, the reference signal generator 310 may generate a reference signal REF in proportion to a phase angle signal PA.

Figure 4B:
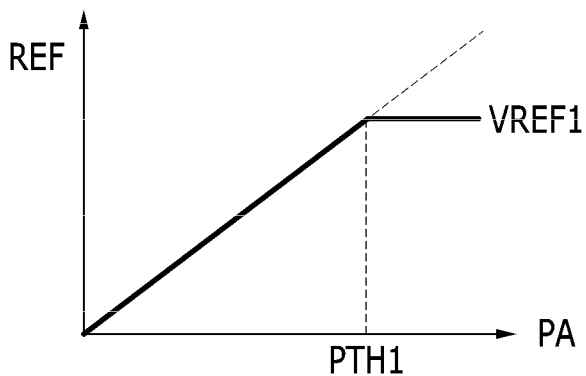
FIG. 4B is a view illustrating another example of a relationship between a phase angle signal and a reference signal.

FIG. 4B is a view illustrating another example of a relationship between a phase angle signal and a reference signal.

As shown in FIG. 4B, the reference signal generator 310 may generate a reference signal REF in proportion to a phase angle signal PA in a region in which the phase angle signal PA is smaller than a predetermined threshold value PTH1, and may generate a reference signal REF at a constant level VREF1 in a region in which the phase angle signal PA is the threshold value PTH1 or more.

Figure 4C:
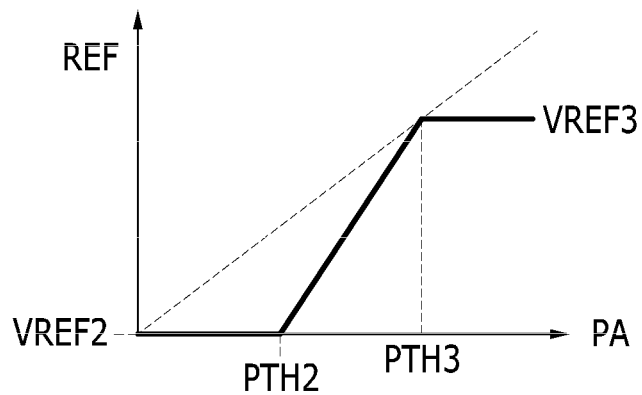
FIG. 4C is a view illustrating still another example of a relationship between a phase angle signal and a reference signal.

FIG. 4C is a view illustrating still another example of a relationship between a phase angle signal and a reference signal.

As shown in FIG. 4C, the reference signal generator 310 may generate a reference signal REF at a constant level VREF2 or VREF3 in respective regions in which a phase angle signal PA is smaller than a predetermined first threshold value PTH2 and is a predetermined second threshold value PTH3 or more, and may generate a reference signal REF having a predetermined slope in proportion to the phase angle signal PA in a region between the first threshold value PTH2 and the second threshold value PTH3.

Like this, as shown in FIG. 4B or 4C, when the detected phase angle is the predetermined threshold value or more, the feedback signal generator 300 may generate an initial feedback signal FBIN to uniformly regulate the current which flows in the load 50.

Proportional slopes of the phase angle signal PA and the reference signal REF shown in FIGS. 4A and 4B and a proportional slope shown in FIG. 4C are different from each other.

The relationships between the phase angle signals and the reference signals shown in FIGS. 4A to 4C are examples for describing the embodiment, but the invention is not limited thereto.

A loop controller 320 generates the initial feedback signal FBIN using the reference signal REF and the detected signal SENSE transmitted from the load detector 200. For example, the loop controller 320 may amplify a difference between a voltage of the detected signal SENSE and a voltage of the reference signal REF, and may generate the initial feedback signal FBIN.

A feedback signal modulator 400 may include at least one of a hysteresis filter 410 and a low-pass filter 420 to remove a noise of the initial feedback signal FBIN.

The hysteresis filter 410 outputs a hysteresis level corresponding to a variation of the initial feedback signal FBIN among a plurality of hysteresis levels as a feedback signal FBMOD.

Figure 5:
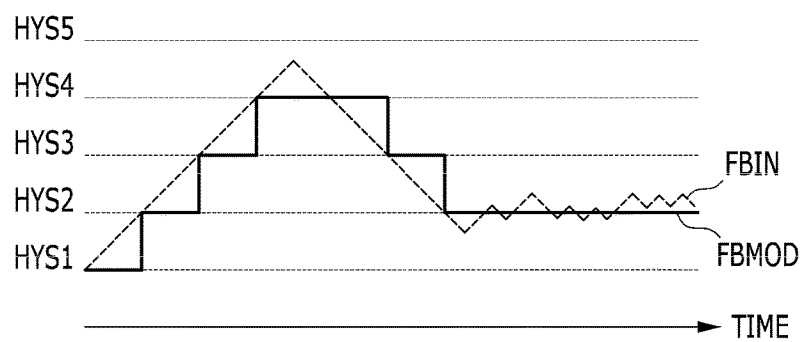
FIG. 5 is a waveform diagram for describing an operation of a hysteresis filter according to one embodiment.

FIG. 5 is a waveform diagram for describing an operation of a hysteresis filter according to one embodiment.

In FIG. 5, an initial feedback signal FBIN is shown as a dashed line, and a feedback signal FBMOD is shown as a solid line. For the sake of convenience, the initial feedback signal FBIN shown in FIG. 5 is shown as a waveform which ascends and descends, and then is changeable in a predetermined range, but the invention is not limited thereto.

As shown in FIG. 5, when the initial feedback signal FBIN ascends and reaches a hysteresis level HYS2, the feedback signal FBMOD ascends from a hysteresis level HYS1 to the hysteresis level HYS2. When the initial feedback signal FBIN reaches a hysteresis level HYS3, the feedback signal FBMOD ascends from the hysteresis level HYS2 to the hysteresis level HYS3, and when the initial feedback signal FBIN reaches a hysteresis level HYS4, the feedback signal FBMOD ascends from the hysteresis level HYS3 to the hysteresis level HYS4.

When the initial feedback signal FBIN descends and reaches the hysteresis level HYS3, the feedback signal FBMOD descends from the hysteresis level HYS4 to the hysteresis level HYS3. When the initial feedback signal FBIN reaches the hysteresis level HYS2, the feedback signal FBMOD descends from the hysteresis level HYS3 to the hysteresis level HYS2.

As shown in FIG. 5, even when the initial feedback signal FBIN is changeable between the hysteresis level HYS3 and the hysteresis level HYS2, the feedback signal FBMOD is maintained at the hysteresis level HYS2.

The low-pass filter 420 performs low-pass filtering on the initial feedback signal FBIN to generate the feedback signal FBMOD. The low-pass filter 420 may be implemented as an analog filter or digital filter.

Figure 6A:
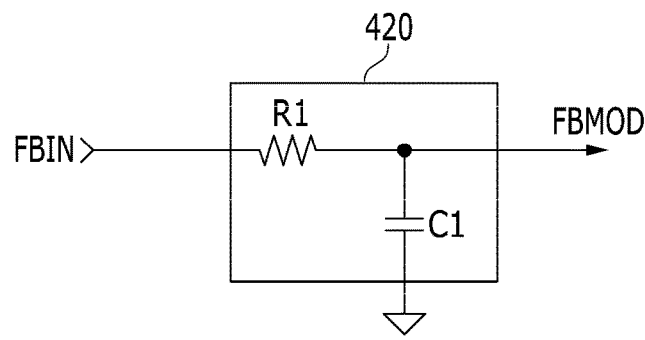
FIG. 6A is a view illustrating a low-pass filter implemented with an analog filter according to one embodiment.

FIG. 6A is a view illustrating a low-pass filter implemented with an analog filter according to one embodiment.

As shown in FIG. 6A, a low-pass filter 420 includes a resistor R1 and a capacitor C1. The initial feedback signal FBIN is input to one end of the resistor R1, and the capacitor C1 is connected to the other end of the resistor R1. A voltage at a point of contact between the resistor R1 and the capacitor C1 becomes a feedback signal FBMOD.

Figure 6B:
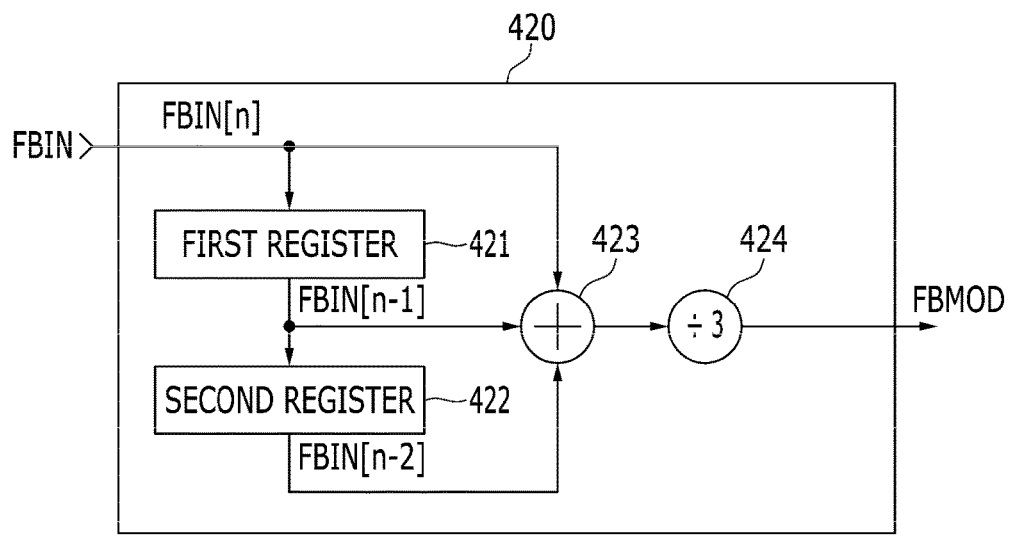
FIG. 6B is a view illustrating a low-pass filter implemented with a digital filter according to one embodiment.

FIG. 6B is a view illustrating a low-pass filter implemented with a digital filter according to one embodiment.

As shown in FIG. 6B, a low-pass filter 420 includes a first register 421, a second register 422, an adder 423, and a divider 424. An initial feedback signal FBIN is sampled by a predetermined cycle, then an initial feedback signal FNIN[n−2] sampled prior to a second cycle is stored in the second register 422, and an initial feedback signal FNIN[n−1] sampled prior to a first cycle is stored in the first register 421.

The adder 423 adds a currently sampled initial feedback signal FNIN[n], the initial feedback signal FNIN[n−1] sampled prior to the first cycle, and the initial feedback signal FNIN[n−2] sampled prior to the second cycle, and the divider 424 calculates an average by dividing the output of the adder 423 by three. The calculated result becomes a feedback signal FBMOD.

The low-pass filter 420 outputs the average of the three sampled initial feedback signals FBIN as the feedback signal FBMOD in FIG. 6B, but the invention is not limited thereto. The number of the sampled initial feedback signals FBIN is at least two, and it may be changed according to a design.

A power transmission controller 500 may include at least one of an input current controller 510 and a powering operation controller 520 to control power transmission according to the feedback signal FBMOD.

The input current controller 510 generates a control signal CTRL which controls an intensity of an input current according to the feedback signal FBMOD. The input current INP is a current which flows into the power transmission circuit 30.

The powering operation controller 520 controls a time during which power is transmitted from the power transmission circuit 30 to the load 50 according to the feedback signal FBMOD. For example, the powering operation controller 520 may detect a power transmission time determined according to the feedback signal FBMOD by counting elapsed time. Alternatively, the powering operation controller 520 may set a period, which is equal to or more than a specific level in which the input voltage VIN_R is determined according to the feedback signal FBMOD, to the power transmission time. A switching device of the power transmission circuit 30 may operate or the current which flows in the load 50 may be controlled at a predetermined level, during the power transmission time.

Figure 7A:
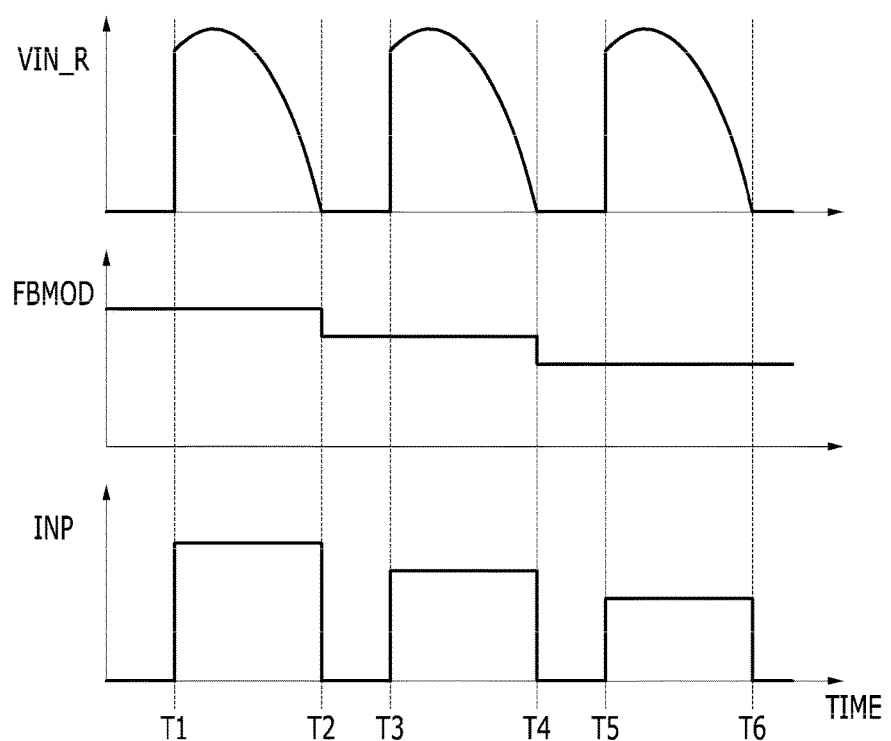
FIG. 7A is a waveform diagram illustrating an input current control according to one embodiment.

FIG. 7A is a waveform diagram illustrating an input current control according to one embodiment.

In FIG. 7A, a feedback signal FBMOD is shown gradationally decreasing, but this is an assumption to explain the input current control according to the feedback signal FBMOD only, and the invention is not limited thereto.

An input voltage VIN_R has a waveform in which full-wave rectification is performed on a voltage VIN passed through the dimmer 10. The input voltage VIN_R ascends at time T1 and an input current INP flows into the power transmission circuit 30. The input voltage VIN_R becomes zero-voltage at time T2, and the input voltage VIN_R is not generated and the input current INP does not flow during a period from time T2 to time T3.

An amount of the input current INP is determined according to a control signal CTRL during a period from time T1 to time T2. For example, the input current controller 510 may generate the control signal CTRL which controls a duty of the power transmission circuit 30 according to the feedback signal FBMOD, or may generate the control signal CTRL as a reference signal which controls the amount of the input current INP.

When the feedback signal FBMOD descends at time T2, the input current controller 510 generates a control signal CTRL to reduce the amount of the input current INP according to the descent of the feedback signal FBMOD. For example, the input current controller 510 may generate the control signal CTRL by which a duty decreases compared to the period from time T1 to time T2, or may generate the control signal CTRL as a reference signal by which the amount of the input current INP decreases compared to the period from time T1 to time T2.

The input voltage VIN_R ascends at time T3 and the input current INP starts to flow into the power transmission circuit 30. The input voltage VIN_R becomes zero-voltage at time T4, and the input voltage VIN_R is not generated and the input current INP does not flow during a period from time T4 to time T5.

As shown in FIG. 7A, the amount of the input current INP during a period from time T3 to time T4 is smaller than the amount of the input current INP during the period from time T1 to time T2.

When the feedback signal FBMOD descends at time T4, the input current controller 510 generates a control signal CTRL to reduce the amount of the input current INP according to the descendent feedback signal FBMOD. For example, the input current controller 510 may generate the control signal CTRL by which a duty decreases compared to the period from time T3 to time T4, or may generate the control signal CTRL as a reference signal by which the amount of the input current INP decreases compared to the period from time T3 to time T4.

The input voltage VIN_R ascends at time T5 and the input current INP starts to flow into the power transmission circuit 30. The input voltage VIN_R becomes zero-voltage at time T6, and the input voltage VIN_R is not generated and the input current INP does not flow after passing time T6.

As shown in FIG. 7A, the amount of the input current INP during a period from time T5 to time T6 is smaller than the amount of the input current INP during the period from time T3 to time T4.

After passing time T6 in FIG. 7A, when the feedback signal FBMOD is uniformly maintained, the amount of the input current INP, which is input to a next cycle of the input voltage VIN_R (not shown), may be the same as the amount of the input current INP during the period from time T5 to time T6.

Figure 7B:
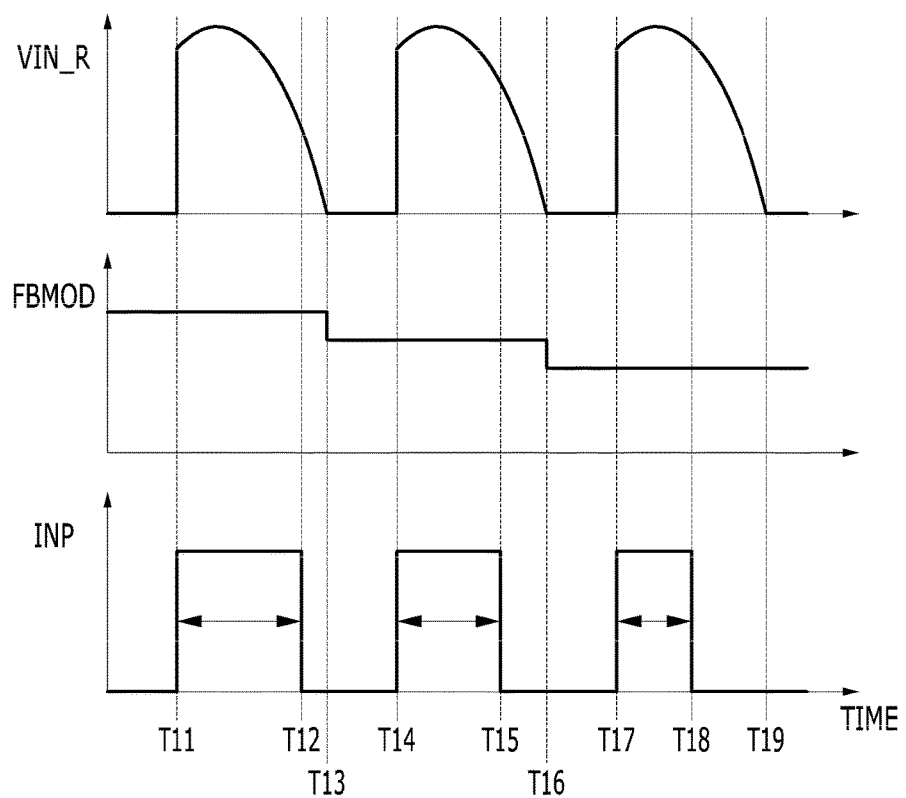
FIG. 7B is a waveform diagram illustrating a power time control according to one embodiment.

FIG. 7B is a waveform diagram illustrating a power time control according to one embodiment.

In FIG. 7B, a feedback signal FBMOD is shown gradationally decreasing, but this is an assumption for describing the power time control according to the feedback signal FBMOD only, and the invention is not limited thereto.

An input voltage VIN_R ascends at time T11 and an input current INP starts to flow into the power transmission circuit 30. The input current INP flows during a period from time T11 to time T12, the input voltage VIN_R becomes zero-voltage at time T13, and the input voltage VIN_R is not generated and the input current INP does not flow during a period from time T13 to time T14.

The period from time T11 to time T12, in which the input current INP flows within one cycle of the input voltage VIN_R, is determined according to a control signal CTRL. For example, the powering operation controller 520 generates the control signal CTRL to control a power transmission time, i.e., a period in which the input current INP flows, according to the feedback signal FBMOD.

Specifically, the powering operation controller 520 may generate a control signal CTRL which controls an enabled period of a switching operation of the power transmission circuit 30. The powering operation controller 520 may generate the control signal CTRL which enables the switching operation of the power transmission circuit 30 during the period from time T11 to time T12.

Further, the powering operation controller 520 may generate a control signal CTRL which controls an enabled period of a reference signal which controls the amount of the input current INP. The reference signal has a predetermined level during the enabled period only, and may be not generated during a disabled period. The powering operation controller 520 transmits a control signal CTRL having a predetermined level as the reference signal during the period from time T11 to time T12 to the power transmission circuit 30, and the power transmission circuit 30 controls the input current INP according to the control signal CTRL during the period from time T11 to time T12. In one cycle of the input voltage VIN_R, the control signal CTRL may not be generated and the input current INP may also not be generated during a disabled period from time T12 to time T13.

When the feedback signal FBMOD descends at time T13, the powering operation controller 520 generates a control signal CTRL to reduce a power transmission time according to the descent of the feedback signal FBMOD. For example, the powering operation controller 520 may generate the control signal CTRL which enables the switching operation of the power transmission circuit 30 during a period from time T14 to time T15 which is short compared to the period from time T11 to time T12. Alternatively, the powering operation controller 520 may generate the control signal CTRL as a reference signal during the period from time T14 to time T15 which is short compared to the period from time T11 to time T12. At this time, a period from time T15 to time T16 is a disabled period of the reference signal and the control signal CTRL may not be generated.

When the feedback signal FBMOD descends at time T16, the powering operation controller 520 generates a control signal CTRL to reduce a power transmission time according to the descent of the feedback signal FBMOD. For example, the powering operation controller 520 may generate the control signal CTRL which enables the switching operation of the power transmission circuit 30 during a period from time T17 to time T18 which is short compared to the period from time T14 to time T15. Alternatively, the powering operation controller 520 may generate the control signal CTRL as a reference signal during the period from time T17 to time T18 which is short compared to the period from time T14 to time T15. At this time, a period from time T18 to time T19 is a disabled period of the reference signal and the control signal CTRL may not be generated.

After passing time T19 in FIG. 7B, when the feedback signal FBMOD is uniformly maintained, the input current INP, which is input to a next cycle of the input voltage VIN_R (not shown), may flow into the power transmission circuit 30 during a period the same as the period from time T17 to time T18.

The power transmission circuit 30 may be implemented by various methods.

Figure 8:
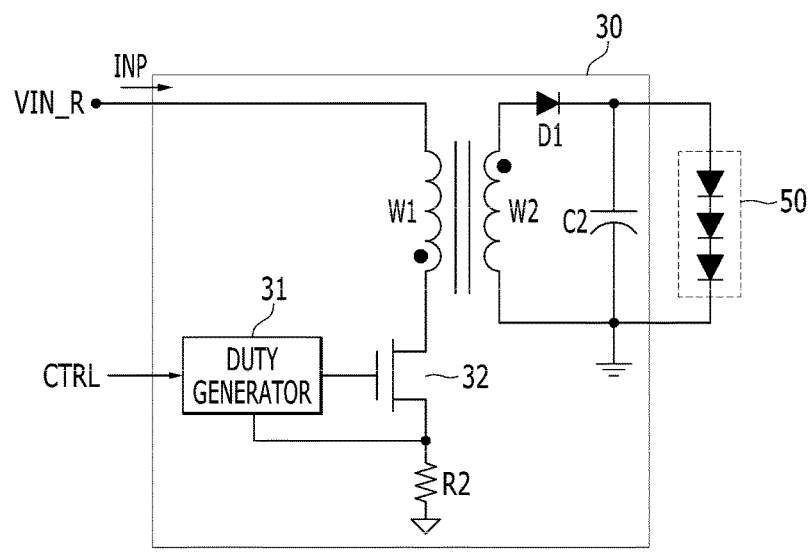
FIG. 8 is a view illustrating one example of a power transmission circuit according to one embodiment.

FIG. 8 is a view illustrating one example of a power transmission circuit according to one embodiment.

As shown in FIG. 8, a power transmission circuit 30 may be implemented as a switch mode power supply.

The power transmission circuit 30 includes a first winding W1 connected to an input voltage VIN_R, a second winding W2 connected to a load 50, a power switch 32, a duty generator 31, a rectifier diode D1, a capacitor C2, and a resistor R2.

The duty generator 31 controls a switching operation of the power switch 32 by a duty according to a control signal CTRL. For example, when an amount of an input current INP is controlled according to the control signal CTRL, the duty generator 31 may control the switching operation of the power switch 32 by the duty according to the control signal CTRL. When a power transmission time is controlled according to the control signal CTRL, the duty generator 31 may control the switching operation of the power switch 32 by a predetermined duty, and may enable or disable the switching operation according to the control signal CTRL.

A current flows into the first winding W1 during a period in which the power switch 32 turns on, energy is stored in the first winding W1, and a current, which flows into the second winding W2, is supplied to the capacitor C2 and the load 50 through the rectifier diode D1 during a period in which the power switch 32 turns off.

Figure 9:
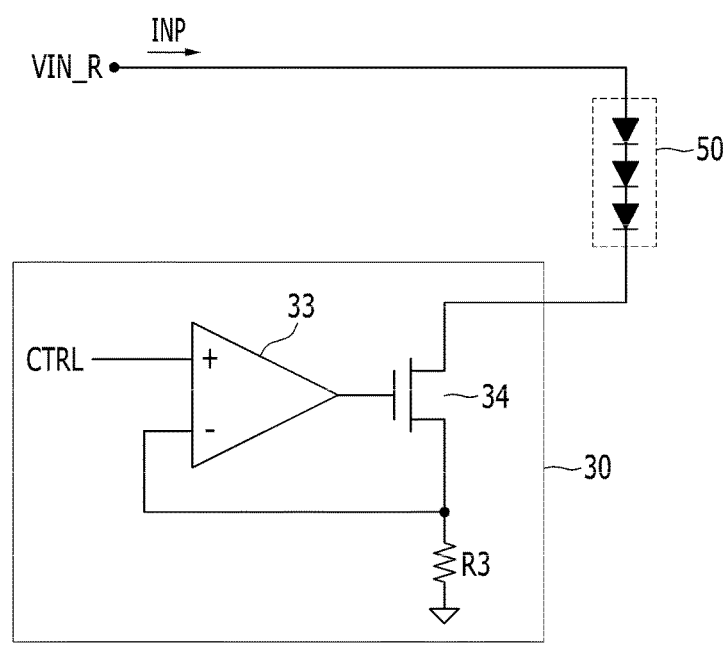
FIG. 9 is a view illustrating another example of a power transmission circuit according to one embodiment.

FIG. 9 is a view illustrating another example of a power transmission circuit according to one embodiment.

As shown in FIG. 9, a power transmission circuit 30 includes a transistor 34, a linear regulator 33, and a resistor R3.

A drain of the transistor 34 is connected to a load 50, the resistor R3 is connected between a source of the transistor 34 and a ground, an output terminal of the linear regulator 33 is connected to a gate of the transistor 34.

The linear regulator 33 may be implemented as an operational amplifier, and when a control signal CTRL is input to a non-inverting terminal (+) of the linear regulator 33, an amount of an input current INP or a power transmission time may be controlled. A voltage of the resistor R3 is input to an inverting terminal (−) of the linear regulator 33, and the output of the linear regulator 33 is determined according to a difference between the input of the inverting terminal (−) and the input of the non-inverting terminal (+). A current, which flows in the transistor 34, is controlled according to the output of the linear regulator 33 so as to control the input of the inverting terminal (−) and the input of the non-inverting terminal (+) to be identical. That is, the current, which flows in the load 50, is controlled according to the control signal CTRL, and thus the input current INP is controlled.

For example, when the amount of the input current INP is controlled according to the control signal CTRL, the current, which flows in the transistor 34, is controlled to have an amount based on the control signal CTRL. When the power transmission time is controlled according to the control signal CTRL, the current, which flows in the transistor 34, flows with the amount based on the control signal CTRL during an enabled period of the control signal CTRL which is a reference signal, and a current does not flow in the transistor 34 during a disabled period of the control signal CTRL.

Like this, a loop control system for controlling power supplied to a load of a power system, to which phase-cut dimming is applied through the embodiment, is provided.

As described above, although the embodiments receive the feedback of the result in which the current supplied to the load is detected, the invention is not limited thereto. For example, an operation of a power transmission circuit may be controlled by an open loop method.

Figure 10:
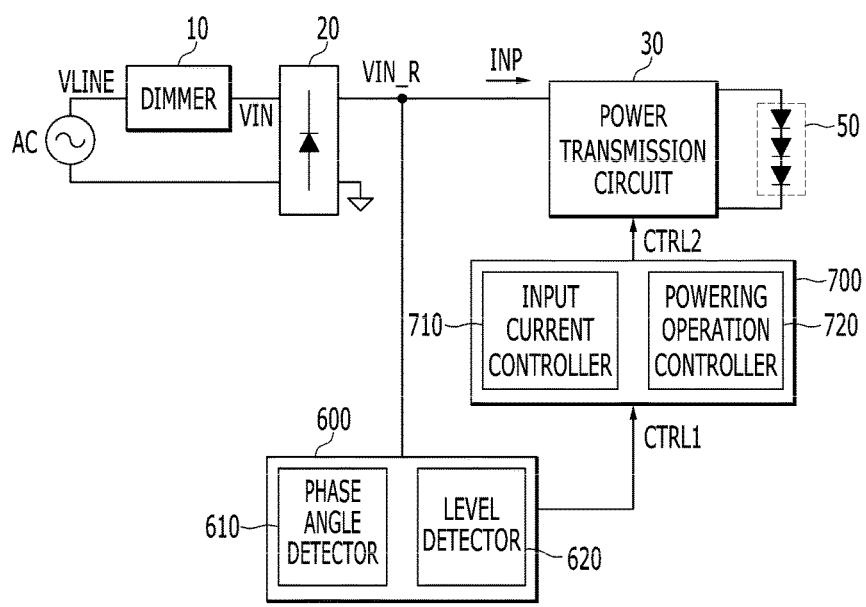
FIG. 10 is an application example of a phase-cut dimming control system according to another embodiment.

FIG. 10 is an application example of a phase-cut dimming control system according to another embodiment.

A load 50 shown in FIG. 10 includes at least one LED.

When compared with the previous embodiments, the embodiment shown in FIG. 10 does not detect a current supplied to the load 50, detects information on an input voltage VIN_R, and a first control signal CTRL1 is generated according to the detection result.

For example, an input voltage detector 600 may generate the first control signal CTRL1 by detecting at least one of a phase angle of the input voltage VIN_R (PT2/(PT1+PT2)) (see FIG. 3), a period PT1 or period PT2 of the input voltage VIN_R, a peak or average of the input voltage VIN_R, and a level of the input voltage VIN_R. The peak of the input voltage VIN_R refers to a peak within a one-cycle period, and refers to a one-cycle average of the input voltage VIN_R. Furthermore, the meaning of the detection of the level of the input voltage VIN_R refers to a determination whether the input voltage VIN_R is a predetermined threshold voltage or more.

Although the input voltage detector 600 includes a phase angle detector 610 and a level detector 620 in FIG. 10, the invention is not limited thereto.

The phase angle detector 610 may detect the input voltage VIN_R to detect the phase angle of the input voltage VIN_R, and may generate a first control signal CTRL according to the detected phase angle. For example, the phase angle detector 610 detects the phase angle using a method the same as that of the phase angle detector 100 described with reference to FIG. 3, and the first control signal CTRL1 is generated according to the detected phase angle.

The level detector 620 may detect the level of the input voltage VIN_R, and may generate a first control signal CTRL according to the detected level. For example, the level detector 620 compares the input voltage VIN_R with the predetermined threshold voltage, and the first control signal CTRL1, which is enabled during a period in which the input voltage VIN_R is the threshold voltage or more, may be generated.

The power transmission controller 700 controls an intensity of an input current or controls a power transmission time using a method the same as that described with the previous embodiment. For example, the power transmission controller 700 may include at least one of an input current controller 710 and a powering operation controller 720.

The input current controller 710 generates a second control signal CTRL2 which controls an amount of the input current according to the first control signal CTRL1. The power transmission circuit 30 controls the amount of the input current according to the second control signal CTRL2 using a method the same as that previously described with reference to FIG. 7A.

When the power transmission circuit 30 is the switch mode power supply shown in FIG. 8, the power transmission circuit 30 may control the switching operation of the power switch 32 using a duty depending on the second control signal CTRL2.

Further, when the power transmission circuit 30 includes the linear regulator 33 shown in FIG. 9, the second control signal CTRL2 may be a reference signal supplied to the non-inverting terminal (+) of the linear regulator 33.

The powering operation controller 720 generates the second control signal CTRL2 which controls a power transmission time according to the first control signal CTRL1. The power transmission circuit 30 controls the power transmission time according to the second control signal CTRL2 using a method the same as that previously described with reference to FIG. 7B.

When the power transmission circuit 30 is the switch mode power supply shown in FIG. 8, the power transmission circuit 30 may enable or disable the switching operation of the power switch 32 according to the second control signal CTRL2.

Further, when the power transmission circuit 30 includes the linear regulator 33 shown in FIG. 9, the second control signal CTRL2 is supplied to the non-inverting terminal (+) of the linear regulator 33. For example, a current flows in the transistor 33 by the output of the linear regulator 33 during an enabled period in which the second control signal CTRL2 is at a predetermined level. The transistor 33 turns off by the output of the linear regulator 33 and a current does not flow in the transistor 33 during a disabled period in which the second control signal CTRL2 is at a ground level.

Although power transmission is controlled by detecting at least one of the phase angle and the level of the input voltage in the embodiment shown in FIG. 10, a current may be supplied to a load according to a predetermined control signal without considering the input voltage.

Figure 11:
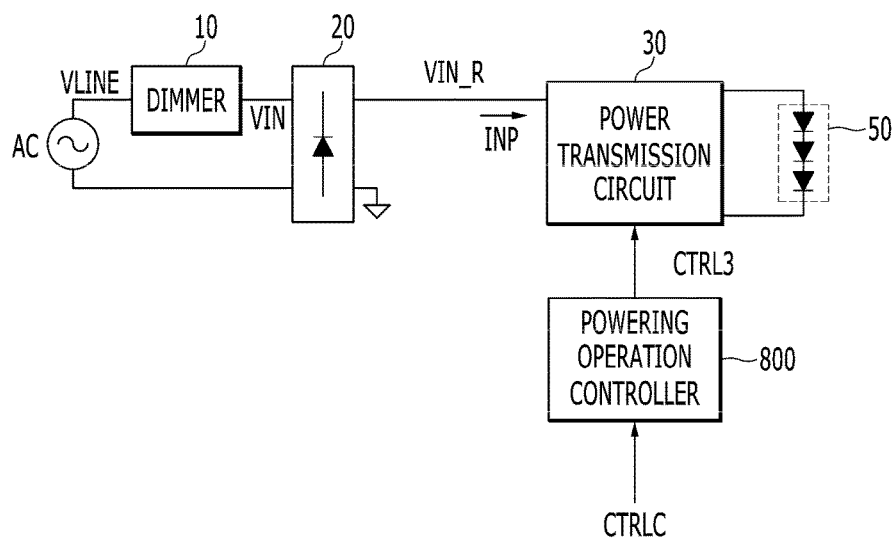
FIG. 11 is an application example of a phase-cut dimming control system according to still another embodiment.

FIG. 11 is an application example of a phase-cut dimming control system according to still another embodiment.

A load 50 shown in FIG. 11 includes at least one LED.

A powering operation controller 800 may receive the input of a control signal CTRLC having a constant level, and may generate a third control signal CTRL3 which controls a power transmission circuit 30 to transmit power during a period depending on the control signal CTRLC.

When the power transmission circuit 30 is the switch mode power supply shown in FIG. 8, the power transmission circuit 30 may enable or disable a switching operation of the power switch 32 according to the third control signal CTRL2.

Further, when the power transmission circuit 30 includes the linear regulator 33 shown in FIG. 9, the third control signal CTRL3 is supplied to the non-inverting terminal (+) of the linear regulator 33. At this time, a current flows in the transistor 33 by the output of the linear regulator 33 during an enabled period in which the third control signal CTRL3 is at a predetermined level. The transistor 33 turns off by the output of the linear regulator 33 and a current does not flow in the transistor 33 during a disabled period in which the third control signal CTRL3 is at a ground level.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the invention as defined by the following claims.

REFERENCE NUMERALS

10: dimmer
20: rectifier circuit
30: power transmission circuit
100, 610: phase angle detector
200: load detector
300: feedback signal generator
310: reference signal generator
320: loop controller
400: feedback signal modulator
410: hysteresis filter
420: low-pass filter
500, 700: power transmission controller
510: input current controller
520, 800: powering operation controller
600: input voltage detector
620: level detector

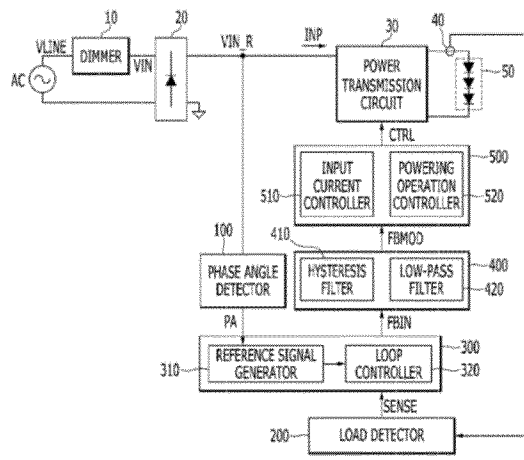

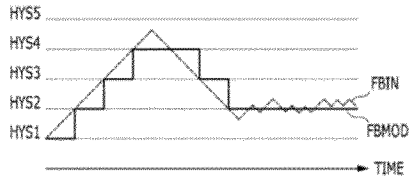

What is claimed is:

1. A phase-cut dimming control system comprising:
a linear regulator configured to control a current that flows in at least one LED, the current being a current of a rectified line voltage;
a power transmission controller configured to receive a feedback current that flows in the at least one LED, and to control the linear regulator to control an amount of an input current supplied to the at least one LED or a period in which the input current flows;
a phase angle detector to generate a phase angle signal based on a phase angle ratio of the rectified line voltage; and
a feedback signal generator configured to generate a reference signal based on the phase angle signal and to generate a feedback signal using a difference between the reference signal and a signal having a value corresponding to a magnitude of the current which flows in the at least one LED,
wherein the power transmission controller controls the linear regulator according to the feedback signal, and
wherein the feedback signal generator generates the reference signal having a first predetermined reference value when the phase angle signal is greater than or equal to a first phase angle threshold value, and generates the reference signal having a predetermined slope in proportion to the phase angle signal when the phase angle signal is less than or equal to the first phase angle threshold value and greater than or equal to a second phase angle threshold value.

2. The phase-cut dimming control system of claim 1, wherein the feedback signal generator is to generate the feedback signal to regulate the current that flows in the at least one LED to have a constant value when the phase angle signal is a predetermined threshold value or more.

3. The phase-cut dimming control system of claim 1, wherein:
the power transmission controller is to generate a control signal according to the feedback signal;
the linear regulator is to control the input current according to the control signal during an enabled period of the control signal; and
the input current is not generated during a disabled period of the control signal.

4. The phase-cut dimming control system of claim 3, wherein the power transmission controller is to determine the enabled period of the reference signal as a period in which an input voltage supplied to the at least one LED is at a level equal to or more than a predetermined level determined according to the feedback signal.

5. The phase-cut dimming control system of claim 3, wherein the power transmission controller is to determine the enabled period of the reference signal as a period in which an input voltage supplied to the at least one LED is at a level equal to or more than a predetermined level determined according to the feedback signal.

6. The phase-cut dimming control system of claim 1, wherein the feedback signal generator generates the reference signal having a second predetermined reference value when the phase angle signal is less than or equal to the second phase angle threshold value.

7. A phase-cut dimming control system, comprising:
a linear regulator configured to control a current that flows in at least one LED, the current being a current of a rectified line voltage;
a power transmission controller configured to receive a feedback current that flows in the at least one LED, and to control the linear regulator to control an amount of an input current supplied to the at least one LED or a period in which the input current flows;
a phase angle detector to generate a phase angle signal based on a phase angle ratio of the rectified line voltage;
a feedback signal generator configured to generate a reference signal based on the phase angle signal and to generate a feedback signal using a difference between the reference signal and a signal having a value corresponding to a magnitude of the current which flows in the at least one LED; and
a feedback signal modulator configured to generate a modulated feedback signal having a plurality of hysteresis levels by modulating, using a hysteresis filter, the feedback signal,
wherein the power transmission controller controls the linear regulator according to the modulated feedback signal.

8. The phase-cut dimming control system of claim 7, wherein the feedback signal generator is to generate the feedback signal to regulate the current that flows in the at least one LED to have a constant value when the phase angle signal is a predetermined threshold value or more.

9. The phase-cut dimming control system of claim 7, wherein:
the power transmission controller is to generate a control signal according to the modulated feedback signal;
the linear regulator is to control the input current according to the control signal during an enabled period of the control signal; and
the input current is not generated during a disabled period of the control signal.

10. A phase-cut dimming control system comprising:
a linear regulator configured to control a current that flows in at least one LED, the current being a current of a rectified line voltage;
an input voltage detector configured to detect a phase angle ratio of an input voltage, detect a level of the input voltage by comparing the input voltage to a predetermined threshold voltage, and to generate a first control signal based on the phase angle ratio and the detected level of the input voltage, the input voltage being supplied to the at least one LED; and
a power transmission controller configured to control the linear regulator according to the first control signal to control an amount of an input current supplied to the at least one LED or a period in which the input current flows,
wherein the first control signal is enabled during a period when the input voltage is greater than or equal to the predetermined threshold voltage,
wherein the first control signal when enabled is generated according to the phase angle ratio, and
wherein the power transmission controller controls the linear regulator to prevent current flowing through the at least one LED when the first control signal is not enabled.

11. The phase-cut dimming control system of claim 10, wherein the input voltage is generated by phase-cut dimming, and the power transmission controller generates a second control signal based on the first control signal and controls the linear regulator using the second control signal.

12. The phase-cut dimming control system of claim 11, wherein the linear regulator comprises:
a transistor configured to receive a current flowing in the at least one LED; and
an amplifier configured to control conduction of the transistor by comparing the second control signal to a sense voltage indicative of the current flowing in the at least one LED.

13. The phase-cut dimming control system of claim 12, wherein the amplifier is an operational amplifier, the sense voltage is received on a first input of the operational amplifier, the second control signal is received on a second input of the operational amplifier, and an output of the operational amplifier is connected to a control electrode of the transistor.

14. The phase-cut dimming control system of claim 13, further comprising a sense resistor on which the sense voltage is developed when the current flowing in the at least one LED flows through the transistor.

* * * * *

UNITED STATES PATENT AND TRADEMARK OFFICE
CERTIFICATE OF CORRECTION

PATENT NO. : 10,412,798 B2
APPLICATION NO. : 15/835119
DATED : September 10, 2019
INVENTOR(S) : Hyunchul Eum et al.

Page 1 of 2

It is certified that error appears in the above-identified patent and that said Letters Patent is hereby corrected as shown below:

On the Title Page

Delete The Title Page and Replace with attached Title Page.

In the Claims

Claim 5 is a duplicate of Claim 4. Therefore, please cancel Claim 5: Column 13, Lines 18-23.

Renumber Claims 6-14 as Claims 5-13 sequentially.

Signed and Sealed this
Seventeenth Day of March, 2020

Andrei Iancu
*Director of the United States Patent and Trademark Office*

(12) United States Patent
Eum et al.

(10) Patent No.: US 10,412,798 B2
(45) Date of Patent: Sep. 10, 2019

(54) CONTROL SYSTEM FOR PHASE-CUT DIMMING

(71) Applicant: FAIRCHILD KOREA SEMICONDUCTOR LTD., Bucheon-si (KR)

(72) Inventors: Hyunchul Eum, Seoul (KR); Youngjong Kim, Seoul (KR); Kuo-Hsien Huang, New Taipei (TW); Chih-Chun Chuang, Taichung (TW); Young Mo Yang, Seoul (KR); Young Je Lee, Bucheon-si (KR); Moon Ho Choi, Bucheon (KR); Moon Sik Song, Bucheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 36 days.

(21) Appl. No.: 15/835,119

(22) Filed: Dec. 7, 2017

(65) Prior Publication Data
US 2018/0098398 A1    Apr. 5, 2018

Related U.S. Application Data

(62) Division of application No. 14/937,179, filed on Nov. 10, 2015, now Pat. No. 9,872,349.
(Continued)

(51) Int. Cl.
*H05B 33/08* (2006.01)

(52) U.S. Cl.
CPC ..... *H05B 33/0818* (2013.01); *H05B 33/0812* (2013.01); *H05B 33/0845* (2013.01);
(Continued)

(58) Field of Classification Search
CPC ............ H05B 33/0818; H05B 33/0812; H05B 33/0845; H05B 33/0809; H05B 33/0815;
(Continued)

(56) References Cited

U.S. PATENT DOCUMENTS 7,295,452 B1    11/2007 Liu
7,667,408 B2 *   2/2010 Melanson ......... H05B 33/0809
                                                315/209 R
(Continued)

*Primary Examiner* — Tung X Le
*Assistant Examiner* — Borna Alaeddini
(74) *Attorney, Agent, or Firm* — AMPACC Law Group, PLLC

(57) ABSTRACT

A phase-cut dimming control system according to the embodiment includes a phase angle detector configured to detect a phase angle of an input voltage generated by phase-cut dimming, a feedback signal generator configured to generate a first reference signal corresponding to the detected phase angle, and generate an initial feedback signal based on a detection signal corresponding to power supplied to a load and the first reference signal, a feedback signal modulator configured to modulate the initial feedback signal and generate a feedback signal, a power transmission controller configured to generate a control signal which controls power transmission according to the feedback signal, and a power transmission circuit configured to transmit power to the load according to the control signal.

13 Claims, 12 Drawing Sheets